United States Patent
Yang et al.

(10) Patent No.: US 11,671,834 B2
(45) Date of Patent: Jun. 6, 2023

(54) ELECTRONIC DEVICE FOR TRANSMITTING/RECEIVING DATA AND METHOD THEREOF

(71) Applicant: Samsung Electronics Co., Ltd., Suwon-si (KR)

(72) Inventors: Yi Yang, Suwon-si (KR); Jiho Shin, Suwon-si (KR); Moonseok Kang, Suwon-si (KR); Hyunchul Kim, Suwon-si (KR); Jonghoon Jang, Suwon-si (KR); Sehwan Choi, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/026,783

(22) Filed: Sep. 21, 2020

(65) Prior Publication Data
US 2021/0099862 A1    Apr. 1, 2021

(30) Foreign Application Priority Data

Oct. 1, 2019   (KR) .......................... 10-2019-0121515

(51) Int. Cl.
*H04W 12/102* (2021.01)
*H04W 12/47* (2021.01)
*H04W 12/037* (2021.01)

(52) U.S. Cl.
CPC ......... *H04W 12/47* (2021.01); *H04W 12/037* (2021.01); *H04W 12/102* (2021.01)

(58) Field of Classification Search
CPC .. H04W 12/47; H04W 12/037; H04W 12/102
See application file for complete search history.

(56) References Cited

U.S. PATENT DOCUMENTS

| 2009/0023476 A1* | 1/2009 | Saarisalo | G06K 7/10237 |
| | | | 455/561 |
| 2009/0166421 A1* | 7/2009 | Finn | G06K 7/0008 |
| | | | 235/439 |

(Continued)

FOREIGN PATENT DOCUMENTS

| EP | 3 206 305 A1 | 8/2017 |
| EP | 3 413 275 A1 | 12/2018 |

(Continued)

OTHER PUBLICATIONS

Yi Yang et al., "Inclusion of UWB Secure Service Information Element," Sep. 12, 2018.

(Continued)

*Primary Examiner* — Trang T Doan
(74) *Attorney, Agent, or Firm* — Jefferson IP Law, LLP

(57) ABSTRACT

An electronic device is provided. The electronic device includes a near-field communication (NFC) communication circuit, an ultra-wideband (UWB) communication circuit connected with the NFC communication circuit, at least one secure element operatively connected with the NFC communication circuit and configured to store security information, and a processor disposed in the NFC communication circuit and operatively connected with the UWB communication circuit, wherein the processor is configured to receive a data request from an external electronic device via the UWB communication circuit, access at least part of the security information stored in the at least one secure element, based on a routing table matching the data request with the at least one secure element, and transmit the at least part of the security information to the external electronic device via the UWB communication circuit.

18 Claims, 12 Drawing Sheets

(56) References Cited

U.S. PATENT DOCUMENTS

| | | | |
|---|---|---|---|
| 2013/0092741 A1 | 4/2013 | Loh et al. | |
| 2013/0160134 A1* | 6/2013 | Marcovecchio | H04L 63/1433 726/26 |
| 2013/0314334 A1 | 11/2013 | Leica et al. | |
| 2015/0271677 A1* | 9/2015 | Van Nieuwenhuyze | H04W 12/128 455/41.1 |
| 2016/0360352 A1* | 12/2016 | Khan | H04W 4/80 |
| 2017/0013457 A1* | 1/2017 | Polak | G06Q 20/3674 |
| 2017/0017958 A1* | 1/2017 | Scott | G06Q 20/40 |
| 2017/0055109 A1* | 2/2017 | Van Nieuwenhuyze | H04W 4/80 |
| 2017/0104511 A1* | 4/2017 | Roehrle | H04W 74/002 |
| 2018/0102812 A1* | 4/2018 | Wennemer | H04B 5/0037 |
| 2019/0205863 A1 | 7/2019 | Shin et al. | |
| 2020/0242063 A1* | 7/2020 | Tramoni | H04B 5/0031 |
| 2020/0286061 A1* | 9/2020 | Wang | G06Q 20/4014 |
| 2020/0305142 A1 | 9/2020 | Jang et al. | |
| 2020/0336303 A1* | 10/2020 | Sierra | H04W 12/041 |

FOREIGN PATENT DOCUMENTS

| | | |
|---|---|---|
| KR | 10-2015-0112721 A | 10/2015 |
| KR | 10-2018-0028696 A | 3/2018 |
| KR | 10-2020-0111558 A | 9/2020 |
| WO | 2015/160450 A1 | 10/2015 |

OTHER PUBLICATIONS

Search Report and written opinion dated Dec. 28, 2020, issued in International Application No. PCT/KR2020/012724.

* cited by examiner

| | AID | Power State | Secure element |
|---|---|---|---|
| 510 | | 511 | 512 |
| | A00000091010 | 0x39 | SIM |
| | A000000A1010 | 0x31 | eSE |
| | A00000091050 | 0x31 | Device Host (AP) |
| 520 | Protocol | Power State | Secure element |
| | ISO-DEP | 0x39 | SIM |
| 530 | Technology | Power State | Secure element |
| | Type A | 0x39 | SIM |
| | Type B | 0x39 | SIM |
| | Type F | 0x39 | SIM |

| Payload IE | | | | | Data Payload |
|---|---|---|---|---|---|
| Payload Type | reserved | USS ID length | Addition Info length | USS ID | Addition Info |
| 00 | 000 | 1110 | 0100 | 0x3250041592E5359532E4444463031* | 0x24313030="$100" |

| Payload IE | | | | | Data Payload |
|---|---|---|---|---|---|
| Payload Type | reserved | USS ID length | Addition Info length | USS ID | Addition Info |
| 00 | 000 | 1110 | 0100 | 0x3250041592E5359532E4444463031 | 0x24313030="$100" |

830 — 6F31840E3250041592E5359532E4444463031A51FBF0C1C611A4F08A00000333010102500B50424F4320435245444954495487010101*

| Index | SE support RF technology | UWB Comm. Module use card RF Gate |
|---|---|---|
| 1 | A ONLY | A |
| 2 | B ONLY | B |
| 3 | A & B | Default A if fail retry B |

FIG.8C

ELECTRONIC DEVICE FOR TRANSMITTING/RECEIVING DATA AND METHOD THEREOF

CROSS-REFERENCE TO RELATED APPLICATION(S)

This application is based on and claims priority under 35 U.S.C. § 119(a) of a Korean patent application number 10-2019-0121515, filed on Oct. 1, 2019, in the Korean Intellectual Property Office, the disclosure of which is incorporated by reference herein in its entirety.

BACKGROUND

1. Field

The disclosure relates to an electronic device for transmitting and receiving data and a method thereof.

2. Description of Related Art

Near-field communication (NFC) is a contactless wireless communication technology capable of exchanging data in a short range of about 10 cm or less using frequencies in an about 13.56 MHz band. An NFC module may be embedded in a mobile terminal to perform various functions, such as payment, authentication, or file transfer.

The user may perform a desired function by placing the mobile terminal directly on an NFC reader. The mobile terminal may extract data associated with security information related to the user from a secure element using an interface between the secure element and an NFC communication circuit in the mobile terminal based on a data request received via the NFC communication circuit and transmit the data to the NFC reader.

The above information is presented as background information only to assist with an understanding of the disclosure. No determination has been made, and no assertion is made, as to whether any of the above might be applicable as prior art with regard to the disclosure.

SUMMARY

NFC has drawbacks such as a short range of communication, vulnerable security as compared with other data transmission/reception technologies, and low data rate.

In contrast, ultra-wideband (UWB) has a longer communication range, but more restrictions in accessing the security area of the electronic device, than NFC.

Aspects of the disclosure are to address at least the above-mentioned problems and/or disadvantages and to provide at least the advantages described below. Accordingly, an aspect of the disclosure is to provide an interface that allows for transmission/reception of data to/from an external electronic device using a UWB communication circuit, along with data transmission between the UWB communication circuit and an NFC communication circuit. Thus, it is possible to increase data rate and security while maintaining the interface between the legacy NFC communication circuit and secure elements.

Additional aspects will be set forth in part in the description which follows and, in part, will be apparent from the description, or may be learned by practice of the presented embodiments.

In accordance with an aspect of the disclosure, an electronic device is provided. The electronic device includes a near-field communication (NFC) communication circuit, an ultra-wideband (UWB) communication circuit connected with the NFC communication circuit, at least one secure element operatively connected with the NFC communication circuit and configured to store security information, and a processor disposed in the NFC communication circuit and operatively connected with the UWB communication circuit, wherein the processor is configured to receive a data request from an external electronic device via the UWB communication circuit, access at least part of the security information stored in the at least one secure element, based on a routing table matching the data request with the at least one secure element, and transmit the at least part of the security information to the external electronic device via the UWB communication circuit.

In accordance with another aspect of the disclosure, an electronic device is provided. The electronic device includes a NFC communication circuit, an UWB communication circuit connected with the NFC communication circuit, at least one secure element operatively connected with the NFC communication circuit and configured to store security information, and a processor disposed in the NFC communication circuit and operatively connected with the UWB communication circuit, wherein the UWB communication circuit is configured to receive a data request from an external electronic device, transmit the received data request to the NFC communication circuit, receive at least part of the security information stored in the at least one secure element, from the NFC communication circuit, and transmit the received at least part of the security information to the external electronic device.

In accordance with another aspect of the disclosure, an electronic device is provided. The electronic device includes a NFC antenna, an UWB antenna, at least one secure element configured to store security information associated with a user of the electronic device, and a communication interface connected with the NFC antenna, the UWB antenna, and the at least one secure element, wherein the communication interface is configured to receive a data request from an external electronic device via the UWB antenna, access at least part of the security information stored in the at least one secure element, based on the reception of the data request, and transmit at least part of the security information to the external electronic device via the UWB antenna.

According to various embodiments, the electronic device has an interface between the UWB communication circuit and the NFC communication circuit to increase the data rate and security while maintaining the interface between the legacy NFC communication circuit and secure elements, thereby enhancing data transmission/reception while increasing compatibility for the legacy algorithm.

According to various embodiments, the UWB communication circuit and the NFC communication circuit may be configured of a single communication circuit. The electronic device may facilitate to access the security information stored in the secure element via the interface between the single communication circuit and the secure element while performing data transmission/reception using UWB signals.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A is a view illustrating an example data request as shown in FIG. 7, according to an embodiment of the disclosure;

FIG. 8B is a view illustrating an example of at least part of security information transmitted to an external electronic device according to an embodiment of the disclosure;

FIG. 8C is a view illustrating an example routing table used by a processor when an electronic device receives an NFC signal according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
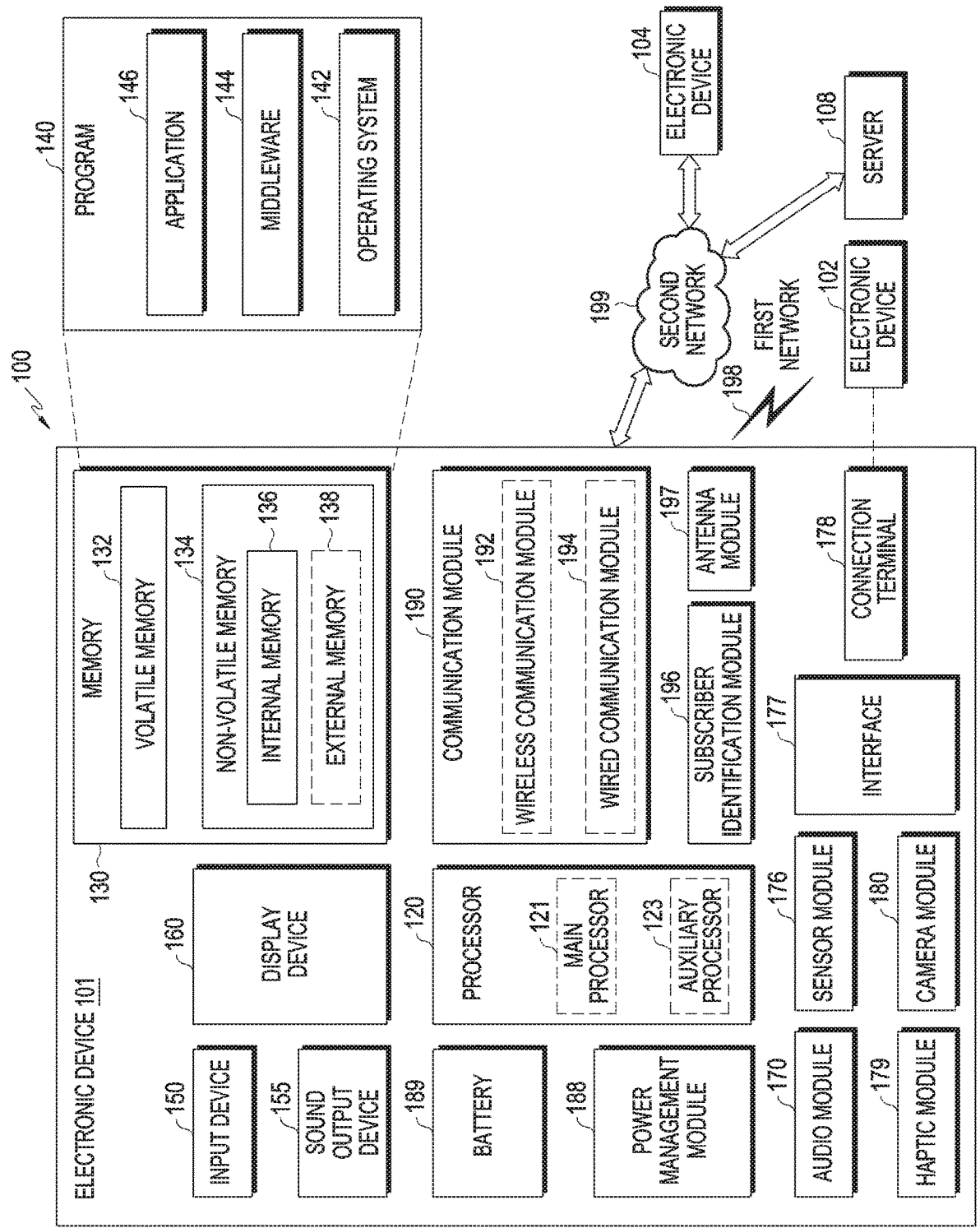
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
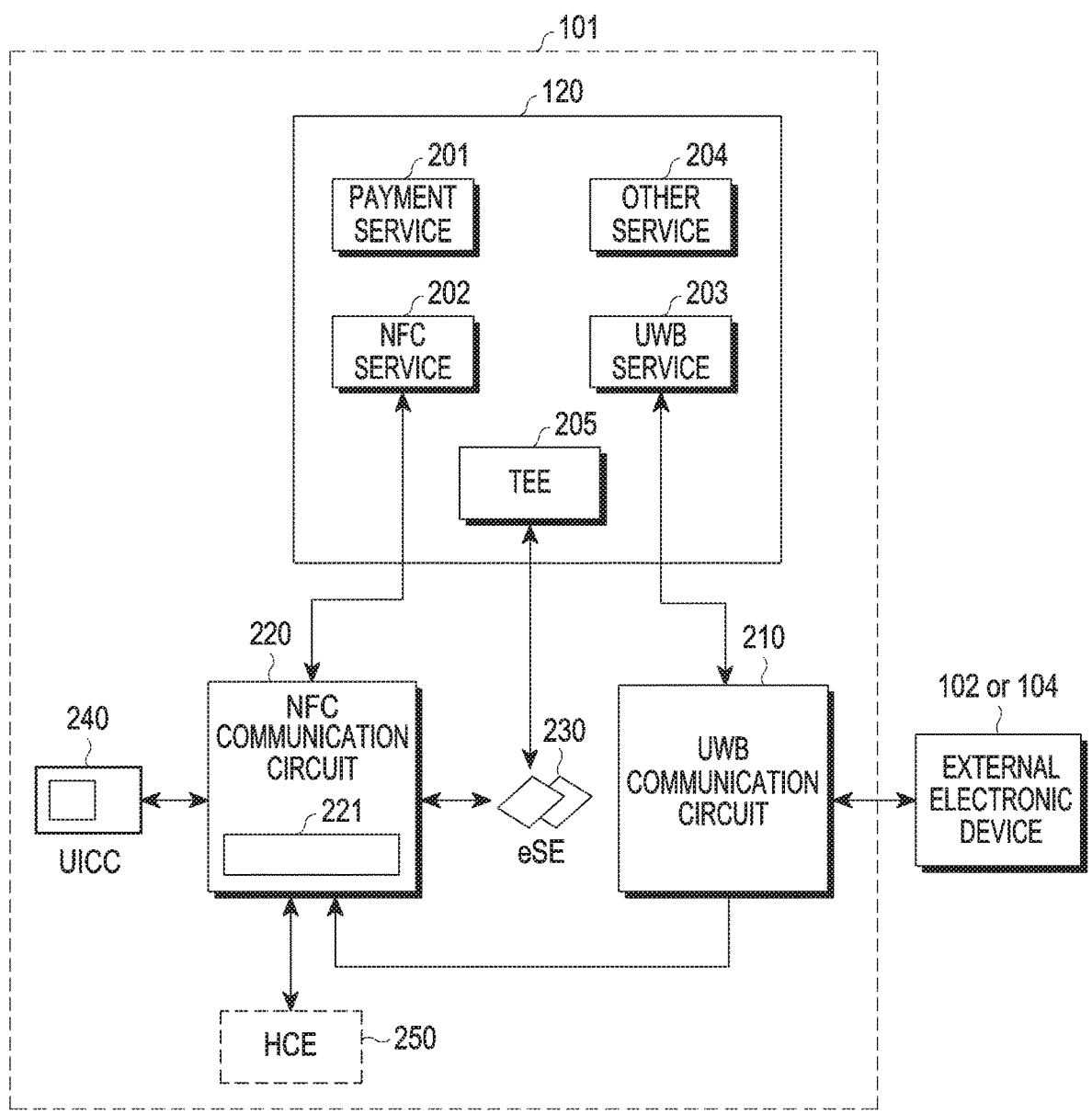
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, an electronic device 101 may include a processor 120, an ultra-wideband (UWB) communication circuit 210, a near-field communication (NFC) communication circuit 220, a processor 221 included in the NFC communication circuit 220, an embedded secure element (eSE) 230, a universal integrated circuit card (UICC) 240, and a host card emulation (HCE) 250. The NFC communication circuit 220 may further include a memory (not shown) storing instructions which, when executed, configure the processor 221 to perform operations. Although the HCE 250 is shown to be included for ease of description, the HCE 250 may be included in a payment service 201 and/or other services 204. The processor 120 may provide at least one of the payment service 201, an NFC service 202 interworking with the NFC communication circuit 220, a UWB service 203 interworking with the UWB communication circuit 210, other services 204, or a trusted execution environment (TEE) 205 interworking with the eSE 230 to control extraction of information stored in the eSE 230. The UWB communication circuit 210 may receive a data request from an external electronic device 102 or 104. The external electronic device 102 or 104 may be an electronic device to provide UWB-based data transmission/reception functions. The data request received from the external electronic device 102 or 104 is described below in detail with reference to FIGS. 3A, 3B, 4A, 4B, and 4C. The electronic device 101 may have an interface to electrically connect the UWB communication circuit 210 with the NFC communication circuit 220, and the UWB communication circuit 210 may transmit the data request received from the external electronic device 102 or 104 to the NFC communication circuit 220 via the interface. When there is no interface to connect the UWB communication circuit 210 with the NFC communication circuit 220, the data received via the UWB communication circuit 210 may be transmitted to the processor 120 and then to the NFC communication circuit 220. In this case, the speed and security may be decreased as compared with when data is transmitted to the NFC communication circuit 220 via the interface to connect the UWB communication circuit 210 with the NFC communication circuit 220. The NFC communication circuit 220 may have an interface to connect with at least one secure element (e.g., the eSE 230, UICC 240, and/or HCE 250) storing security information associated with the user of the electronic device 101. The eSE 230 or UICC 240 may store payment information in the form of an applet. For example, the eSE 230 or UICC 240 may include applets, such as transportation card applets, car key applets, or employ ID applets. For example, the HCE 250 may store the security information in the form of an Android operating system (OS) application. The NFC communication circuit 220 may identify the secure element (e.g., 230, 240, or 250) corresponding to the data request received from the UWB communication circuit 210 based on the information (e.g., a routing table) received from the processor 120. The NFC communication circuit 220 may access the security information stored in the at least one identified secure element (e.g., 230, 240, or 250). The at least one secure element (e.g., 230, 240, or 250) may include at least one of the eSE 230, UICC 240, and/or HCE 250.

According to an embodiment, in the electronic device, the UWB communication circuit 210, NFC communication circuit 220, and eSE 230 may be configured as a single chip. In such a case, the single chip may include a UWB antenna, an NFC antenna, and a communication interface to connect the NFC antenna, UWB antenna, and at least one secure element and may store security information associated with the user. For example, the electronic device including the single chip may receive a data request from an external electronic device via the UWB antenna and transmit at least part of the security information stored in the single chip to the external electronic device.

According to an embodiment, the electronic device may include the NFC communication circuit 220 and UWB communication circuit 210 storing the security information associated with the user and may include a communication interface connected with the UWB communication circuit 210 and NFC communication circuit 220. In this case, the electronic device may receive a data request from the external electronic device via the UWB communication circuit 210. At least part of the security information stored in the NFC communication circuit 220 may be transferred to the UWB communication circuit 210 via the communication interface and be transmitted to the external electronic device via UWB communication. However, the kind of secure elements described herein is merely an example and, without limitations to the scope of the disclosure, other various secure elements may be included.

Figure 3A:
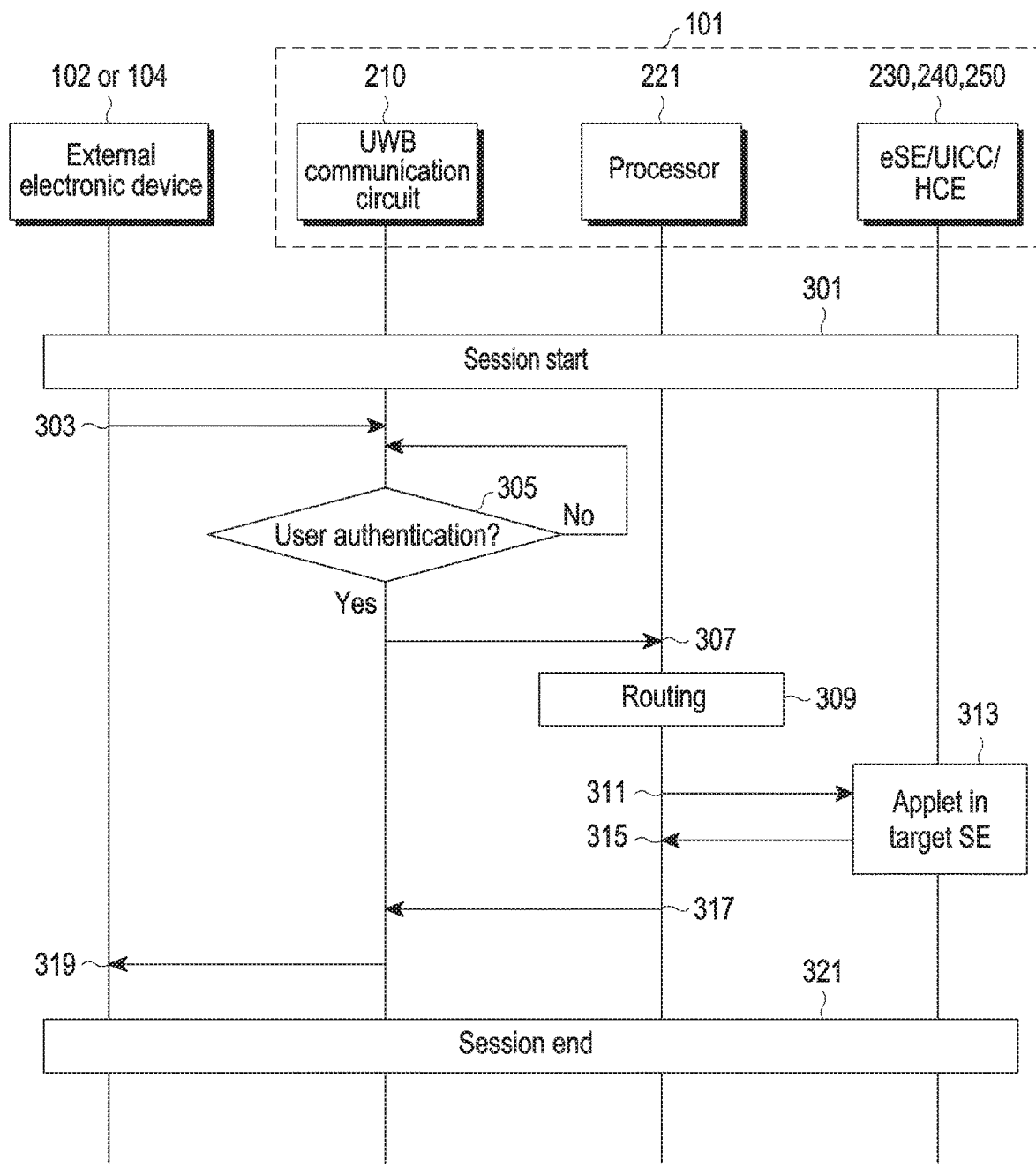
FIG. 3A is a view illustrating an example operation of an electronic device performing data transmission/reception with an external electronic device according to an embodiment of the disclosure.

FIG. 3A is a view illustrating an example operation of an electronic device performing data transmission/reception with an external electronic device according to an embodiment of the disclosure.

FIG. 3A is an example flowchart for describing the overall operation of data transmission/reception with an external electronic device by an electronic device, and detailed operations may differ depending on information about a data request received from the external electronic device. Operations which are varied depending on the information contained in the data request are described below in detail with reference to FIGS. 7 to 10.

Referring to FIG. 3A, in operation 301, the electronic device 101 and external electronic device 102 or 104 may start a session for data transmission/reception. When the electronic device 101 and external electronic device 102 or 104 are located within a distance (e.g., about one meter) predefined by UWB communication, the session may commence, and a UWB reader or POS machine corresponding to the external electronic device 102 or 104 may interwork with the UWB communication circuit 210, triggering data transmission/reception. According to various embodiments, the electronic device 101 may discover the external electronic device (e.g., 102 or 104) via Bluetooth low energy (BLE) using a communication module (e.g., the wireless communication module 192 of FIG. 1). When the external electronic device (e.g., 102 or 104) is discovered, the electronic device 101 may switch on the UWB communication circuit 210, starting the session with the external electronic device (e.g., 102 or 104).

In operation 303, the external electronic device 102 or 104 may transmit a data request to the UWB communication circuit 210 of the electronic device 101. For example, the data request may include media access controller (MAC) payload supported in IEEE 802.15.4-2015.

Figure 4A:
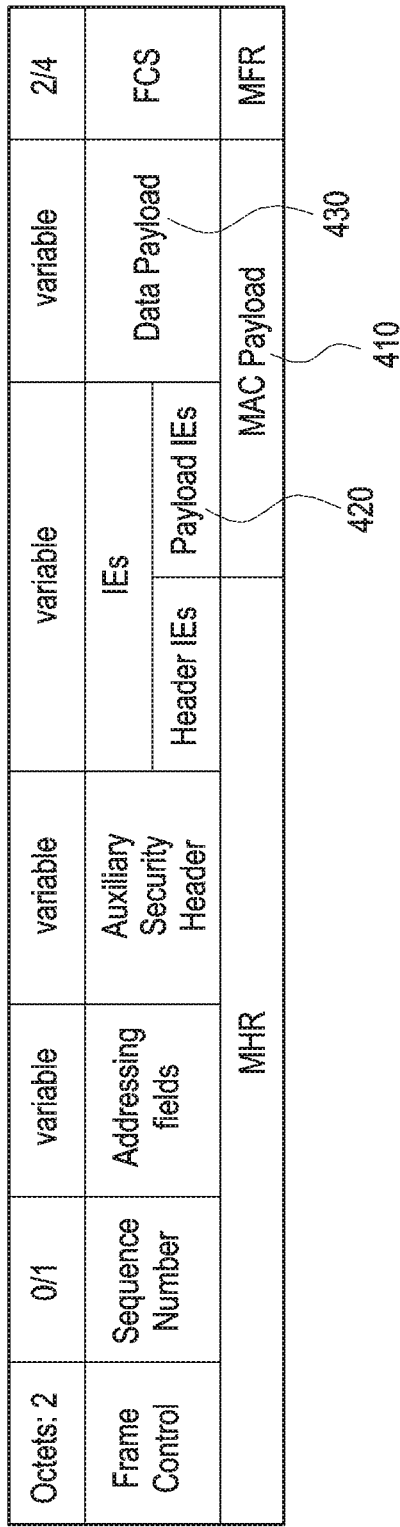
FIG. 4A is a view illustrating a media access controller (MAC) payload data format of IEEE 802.15.4-2015 according to an embodiment of the disclosure.

FIG. 4A is a view illustrating a MAC payload data format of a data request as per IEEE 802.15.4-2015 according to an embodiment of the disclosure.

Referring to FIG. 4A, the data request transmitted from the external electronic device 102 or 104 to the UWB communication circuit 210 may have a payload data format defined by USS IE to IEEE 802.15.4z. Referring to FIG. 4A, the data request may include an MAC payload 410 composed of payload IEs 420 and data payload 430 as defined in USS IE to IEEE 802.15.4z. The payload IEs 420 may include a USS IE 423 including a payload type 421 to which 0 bits to 2 bits have been allocated and a USS ID 422 to which 0 bits to 16 bits have been allocated.

Figure 4B:
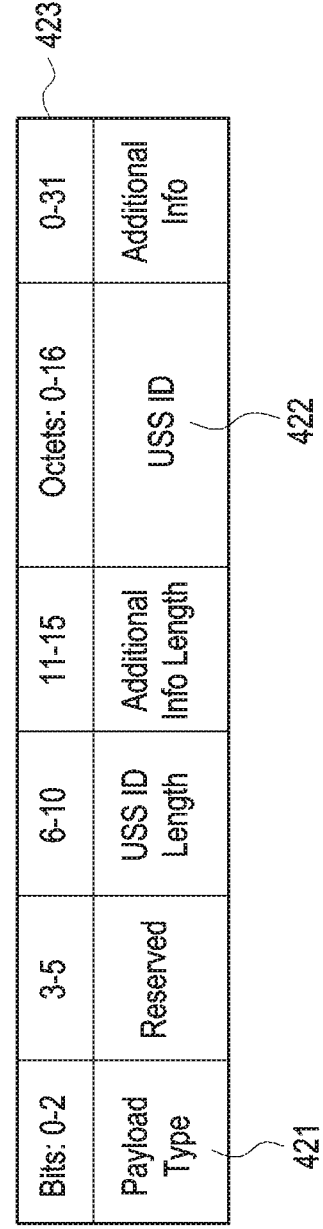
FIG. 4B is a view illustrating a UWB secure service information element (USS IE) as per IEEE 802.15.9, according to an embodiment of the disclosure.

FIG. 4B is a view illustrating a UWB secure service information element (USS IE) as per IEEE 802.15.9, according to an embodiment of the disclosure.

Figures 4C, 5:
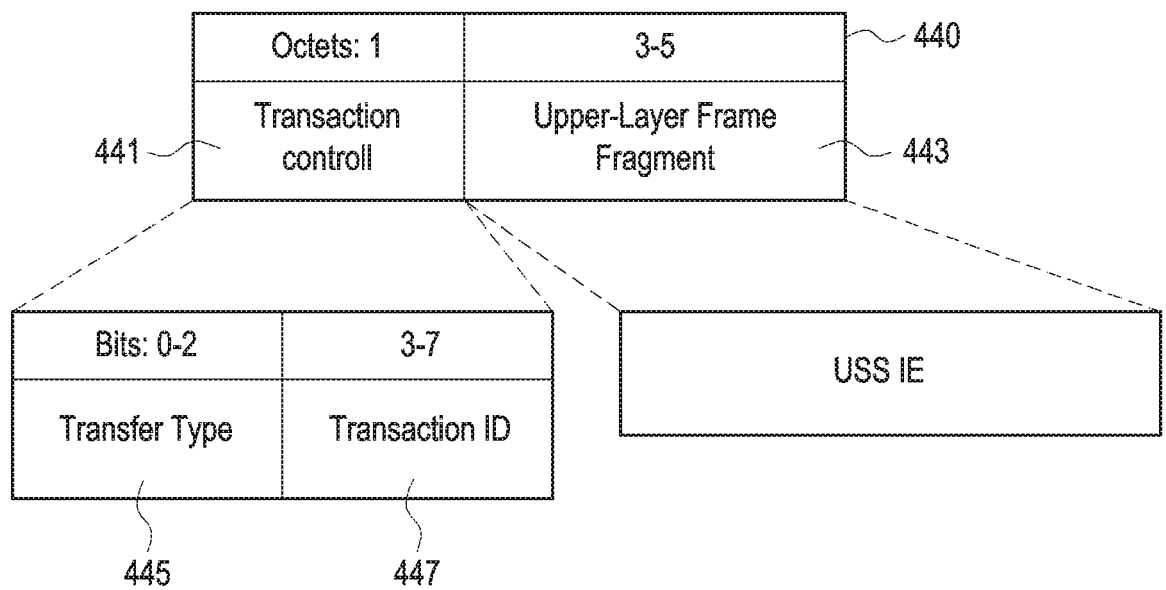
FIG. 4C is a view illustrating an multiplexed information element (MPX IE) as per IEEE 802.15.9, according to an embodiment of the disclosure.
FIG. 5 is an example table for a routing table for a processor to access at least one secure element according to an embodiment of the disclosure.

FIG. 4C is a view illustrating a multiplexed information element (MPX IE) as per IEEE 802.15.9, according to an embodiment of the disclosure.

Referring to FIGS. 4B and 4C, according to an embodiment, the USS IE 423 may be included in the MPX IE 440 disclosed in IEEE 802.15.9. For example, as shown in FIG. 4C, the MPX IE may be included in the MAC payload (e.g., the payload IEs 420 of FIG. 4A) and may include a transaction control 441 and an upper-layer frame fragment 443.

For example, the transaction control 441 may include transfer type (445) fields and transaction ID (447) fields. The transfer type 445 may indicate the type of the MPX IE 440 and have a three-bit length. For example, when the MPX IE 440 includes the USS IE 450, the transfer type 445 may be set to a designated value (e.g., 0b001). The transaction ID 447 may include a unique value used for the transaction and may have a five-bit length. For example, when the MPX IE 440 includes the USS IE 450, the transaction ID 447 may include the MPX ID. For example, the MPX ID included in the transaction ID 447 may be set to a value indicating that the MPX IE or frame includes information used for security transaction.

The upper-layer frame fragment 443 may have a variable length. The upper-layer frame fragment 443 may include part of the frame of the upper layer. The upper-layer frame fragment 443 may be empty. According to an embodiment, the USS IE 450 (e.g., the USS IE 423 of FIG. 4B) may be included in the upper-layer frame fragment (443) field. For example, the upper-layer frame fragment (443) field may include the USS IE 450 depending on the value set for the transaction ID 447.

Specifically, the USS IE 450 may have a structure of the USS IE 423 of FIG. 4B. The payload type 421 and the USS ID 422 may store information for determining which one of the at least one secure element (e.g., the eSE 230, UICC 240, and/or HCE 250) the processor (e.g., the processor 221) is to access. The data payload 430 may include information that the processor 221 transmits to access the security information stored in at least one secure element (e.g., 230, 240, or 250).

In operation 305, the UWB communication circuit 210 may identify whether user authentication is required for the UWB communication circuit 210 to forward the data request to the processor 221 and, if required, perform user authentication. For example, user authentication may be performed in various manners, such as by recognizing the user's iris, fingerprint, or pattern. The electronic device 101 may configure a user authentication scheme on a specific service (or specific application identifier (AID)) and may refrain from performing user authentication according to the configured scheme.

When user authentication is done, the UWB communication circuit 210 may transmit the data request to the processor 221 in operation 307. Unless user authentication is done, the UWB communication circuit 210 may re-perform user authentication. Although the UWB communication circuit 210 is described to transmit the data request to the processor 221, embodiments of the disclosure are not limited thereto. For example, according to an embodiment, the UWB communication circuit 210 may store a routing table matching the AID included in the payload IE with the secure element (e.g., 230, 240, or 250), and the electronic device 101 may have an interface to connect the UWB communication circuit 210 with the eSE 230. In this case, when user authentication is done, the AID included in the payload ID may be identified and, only when the target secure element is not the eSE 230, the operations subsequent to operation 307 may be performed.

In operation 309, according to reception of the data request, the processor 221 may perform routing to determine which one of the at least one secure element (e.g., 230, 240, or 250) the processor 221 is to access to obtain security information. The processor 221 may parse the MAC payload or MPX IE included in the data request, identifying the information included in the USS IE 423. The processor 221 may identify the target secure element (e.g., 230, 240, or 250) corresponding to the information included in the USS ID 422 and payload type 421 of the USS IE 423 to observe the IEEE 802.15.9 standard based on the routing table received from an application processor (e.g., the processor 120 of FIG. 1). The payload type 421 may be two-bit long and may have a value ranging from 0 to 3. Depending on whether the AID is included in the USS ID 422, the target secure element (e.g., 230, 240, or 250) accessed by the processor 221 may be varied, and the path (card RF gate or contactless tunneling (CLT)) along which the target secure element (e.g., 230, 240, or 250) is accessed may be varied. Or, based on the information included in the data payload, the processor 221 may configure different paths along which the target secure element (e.g., 230, 240, or 250) is accessed. Data is transmitted between the external electronic device (e.g., 102 or 104) and the UWB communication circuit 210 and/or between the UWB communication circuit 210 and the processor 221, in the MAC payload format of IEEE 802.15.4-2015 but, for ease of description, the following description is made in view of the MAC payload of the MAC payload data format of IEEE 802.15.9. In a case where the UWB communication circuit 210 stores the routing table matching the AID included in the payload IE with the secure element (e.g., 230, 240, or 250), operation 309 may be omitted by the UWB communication circuit 210.

FIG. 5 is an example table for a routing table for a processor to access at least one secure element according to an embodiment of the disclosure.

Referring to FIG. 5, according to an embodiment, a routing table (e.g., the processor 221 of FIG. 2) may include an AID 510 included in a payload IE, a protocol 520, or technology 530 and the secure element 512 corresponding to the power state 511 of the electronic device. For example, when the payload IE includes the AID 510, the routing table may include information that matches A00000091010 with SIM, A000000A1010 with eSE, and A00000091050 with Device Host(AP). For example, when the payload IE does not include the AID, the routing table may include information that matches the ISO protocol default value with SIM. For example, when the payload IE does not include the AID, the routing table may include information that matches type A with SIM, type B with SIM, and type F with SIM. For example, when the USS ID 422 included in the USS IE 423 of FIG. 4B includes AID(A00000091010), the processor 221 may identify that the SIM (e.g., the UICC 240) is the target secure element. The processor 221 may receive the routing table that matches the payload IE with the at least one secure element from the processor 120.

The processor 221 may parse the payload IE to identify the payload type, USS ID, AID 510 included in the USS ID, protocol 520, and type-associated technology 530 and may identify the target secure element corresponding to the payload type and USS ID to observe the IEEE 802.15.4-2015 standard. The processor 221 may access the target secure element 512 identified by the above operations, obtaining security information. The routing table shown in FIG. 5 is merely an example and does not limit the spirit of the disclosure.

According to an embodiment, the routing table may include information about the power state 511 of the electronic device capable of accessing secure elements. In the routing table, "0x39" may mean that the electronic device may access the corresponding secure element regardless of the on/off of the electronic device, and "0x31" may denote that the electronic device may access the corresponding secure element only when the electronic device is in the on state.

Referring to FIG. 3A, in operation 311, the processor (processor 221) may transmit data payload to the target secure element (e.g., 230, 240, or 250) identified by the result of routing among at least one secure element to access the security information stored in the at least one secure element. As the target secure element (e.g., 230, 240, or 250) receives the data payload, at least part of the security information corresponding to the data payload received from the processor 221 may be identified from the applet in the target secure element (e.g., 230, 240, or 250), in operation 313. The target secure element (e.g., 230, 240, or 250) may include one or more applets. When the target secure element (e.g., 230, 240, or 250) includes one or more applets, the target secure element (e.g., 230, 240, or 250) may identify at least part of the security information corresponding to the data payload from one of the one or more applets included in the target secure element (e.g., 230, 240, or 250) according to the information included in the data request. In operation 315, at least part of the security information may be transmitted from the target secure element to the processor 221.

In operation 317, at least part of the security information may be transmitted from the processor 221 to the UWB communication circuit 210 and, in operation 319, the UWB communication circuit 210 may transmit at least part of the security information to the external electronic device (e.g., 102 or 104). For example, as at least part of the security information is transmitted from the UWB communication circuit 210 to the external electronic device (e.g., 102 or 104), payment may be performed using the electronic device 101. As transmission of at least part of the security information is done, the session between the electronic device 101 and the external electronic device (e.g., 102 or 104) may be terminated in operation 321.

According to an embodiment, the electronic device 101 may perform data transmission/reception with a plurality of external electronic devices (e.g., 102 or 104) corresponding to UWB readers. After the session with a first external electronic device among the plurality of external electronic devices (e.g., 102 or 104) is done, a session with a second external electronic device may begin, performing data transmission/reception. In such a case, the first external electronic device and second external electronic device may configure the processor 221 to access different secure elements (230, 240, or 250) and transmit at least part of different pieces of security information to the first external electronic device and the second external electronic device.

According to an embodiment, the electronic device may include an NFC antenna, a UWB antenna, at least one secure element storing security information associated with the user of the electronic device, and a communication interface connected with the NFC antenna, UWB antenna, and at least one secure element. According to an embodiment, the electronic device may control the communication interface to perform the operations of the UWB communication circuit 210 and processor 221 of FIG. 3A in a single communication circuit with both the NFC antenna and UWB antenna. The communication interface may receive a data request from an external electronic device via the UWB antenna. The communication interface may have a connection for accessing at least one secure element, and the communication interface may access at least part of the security information stored in the at least one secure element via the connection and transmit at least part of the security information to the external electronic device via the UWB antenna. As set forth above, the electronic device having a single communication circuit which includes both the NFC antenna and UWB antenna may perform the operations of FIG. 3A within a range configured for the communication interface, and this may apply likewise to the following descriptions made in connection with the drawings.

Figure 3B:
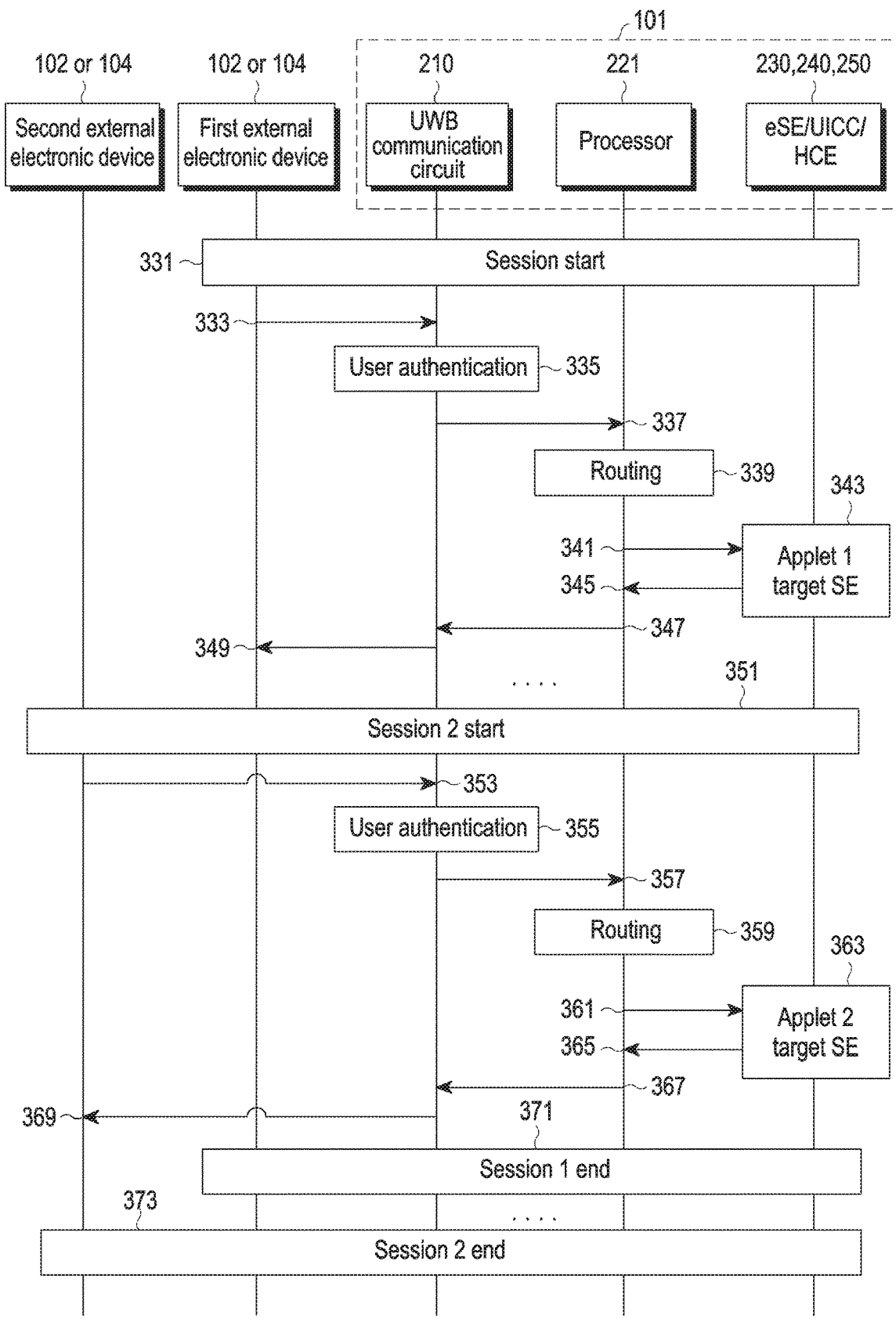
FIG. 3B is a view illustrating an example operation of an electronic device performing data transmission/reception with an external electronic device according to an embodiment of the disclosure.

FIG. 3B is a view illustrating an example operation of an electronic device performing data transmission/reception with an external electronic device according to an embodiment of the disclosure. The operations of FIG. 3B are similar to the operations of FIG. 3A and, thus, are not described below in detail. According to an embodiment, the first external electronic device may be a home door access transaction, and the second external electronic device may be a car access transaction.

Referring to FIG. 3B, in operation 331, the electronic device 101 and the first external electronic device 102 or 104 may start a first session for data transmission/reception. When the electronic device 101 and the first external electronic device 102 or 104 are positioned within a distance (e.g., about one meter) predefined by UWB communication, the session may begin.

In operation 333, the first external electronic device 102 or 104 may transmit a data request to the UWB communication circuit 210 of the electronic device 101. For example, the data request may include MAC payload supported in IEEE 802.15.4-2015.

In operation 335, the UWB communication circuit 210 may perform user authentication depending on whether user authentication is required for the UWB communication circuit 210 to forward the data request to the processor 221.

When user authentication is done, the UWB communication circuit 210 may transmit the data request to the processor 221 in operation 337.

In operation 339, according to reception of the data request, the processor 221 may perform routing to determine which one of the at least one secure element (e.g., 230, 240, or 250) the processor 221 is to access to obtain security information. The processor 221 may parse the MAC payload or MPX IE included in the data request, identifying the information included in the USS IE 423. The processor 221 may identify the target secure element (e.g., 230, 240, or 250) corresponding to the information included in the USS ID 422 and payload type 421 of the USS IE 423 to observe the IEEE 802.15.9 standard based on the routing table received from an application processor (e.g., the processor 120 of FIG. 1).

In operation 341, the processor (processor 221) may transmit data payload to the target secure element (e.g., 230, 240, or 250) identified by the result of routing among at least one secure element to access the security information stored in the at least one secure element.

As the target secure element (e.g., 230, 240, or 250) receives the data payload, at least part of the security information corresponding to the data payload received from the processor 221 may be identified from the applet (e.g., Applet1) in the target secure element (e.g., 230, 240, or 250), in operation 343. The target secure element (e.g., 230, 240, or 250) may include one or more applets. When the target secure element (e.g., 230, 240, or 250) includes one or more applets, the target secure element (e.g., 230, 240, or 250) may identify at least part of the security information corresponding to the data payload from one of the one or more applets included in the target secure element (e.g., 230, 240, or 250) according to the information included in the data request. In operation 345, at least part of the security information may be transmitted from the target secure element to the processor 221.

In operation 347, at least part of the security information may be transmitted from the processor 221 to the UWB communication circuit 210. In operation 349, the UWB communication circuit 210 may transmit at least part of the security information to the first external electronic device 102 or 104. For example, as at least part of the security information is transmitted from the UWB communication circuit 210 to the first external electronic device (e.g., 102 or 104), home door unlocking using the electronic device 101 may be carried out.

In operation 351, the electronic device 101 and the second external electronic device 102 or 104 may start a second session for data transmission/reception. When the electronic device 101 and the second external electronic device 102 or 104 are positioned within a distance (e.g., about one meter) predefined by UWB communication, the second session may begin. The second session may start while the first session between the electronic device 101 and the first external electronic device 102 or 104 is maintained.

In operation 353, the second external electronic device 102 or 104 may transmit a data request to the UWB communication circuit 210 of the electronic device 101. For example, the data request may include MAC payload supported in IEEE 802.15.4-2015.

In operation 355, the UWB communication circuit 210 may perform user authentication depending on whether user authentication is required for the UWB communication circuit 210 to forward the data request to the processor 221.

When user authentication is done, the UWB communication circuit 210 may transmit the data request to the processor 221 in operation 357.

In operation 359, according to reception of the data request, the processor 221 may perform routing to determine which one of the at least one secure element (e.g., 230, 240, or 250) the processor 221 is to access to obtain security information. The processor 221 may parse the MAC payload or MPX IE included in the data request, identifying the information included in the USS IE 423. The processor 221 may identify the target secure element (e.g., 230, 240, or 250) corresponding to the information included in the USS ID 422 and payload type 421 of the USS IE 423 to observe the IEEE 802.15.9 standard based on the routing table received from an application processor (e.g., the processor 120 of FIG. 1).

In operation 361, the processor 221 may transmit data payload to the target secure element (e.g., 230, 240, or 250) identified by the result of routing among at least one secure element to access the security information stored in the at least one secure element.

As the target secure element (e.g., 230, 240, or 250) receives the data payload, at least part of the security information corresponding to the data payload received from the processor 221 may be identified from the applet (e.g., Applet2) in the target secure element (e.g., 230, 240, or 250), in operation 363. The target secure element (e.g., 230, 240, or 250) may include one or more applets. When the target secure element (e.g., 230, 240, or 250) includes one or more applets, the target secure element (e.g., 230, 240, or 250) may identify at least part of the security information corresponding to the data payload from one of the one or more applets included in the target secure element (e.g., 230, 240, or 250) according to the information included in the data request. The applet (e.g., Applet2) identified in operation 363 may be an applet included in the same target secure element (e.g., 230, 240, or 250) as the applet (e.g., Applet1)

identified in operation 343 or may be an applet included in different target secure elements (e.g., 230, 240, or 250). In operation 365, at least part of the security information may be transmitted from the target secure element to the processor 221.

In operation 367, at least part of the security information may be transmitted from the processor 221 to the UWB communication circuit 210. In operation 369, the UWB communication circuit 210 may transmit at least part of the security information to the second external electronic device 102 or 104. For example, as at least part of the security information is transmitted from the UWB communication circuit 210 to the second external electronic device (e.g., 102 or 104), car door unlock using the electronic device 101 may be carried out.

In operation 371, the first session between the electronic device 101 and the first external electronic device 102 or 104 may be terminated and, in operation 373, the second session between the electronic device 101 and the second external electronic device 102 or 104 may be terminated.

Figure 6:
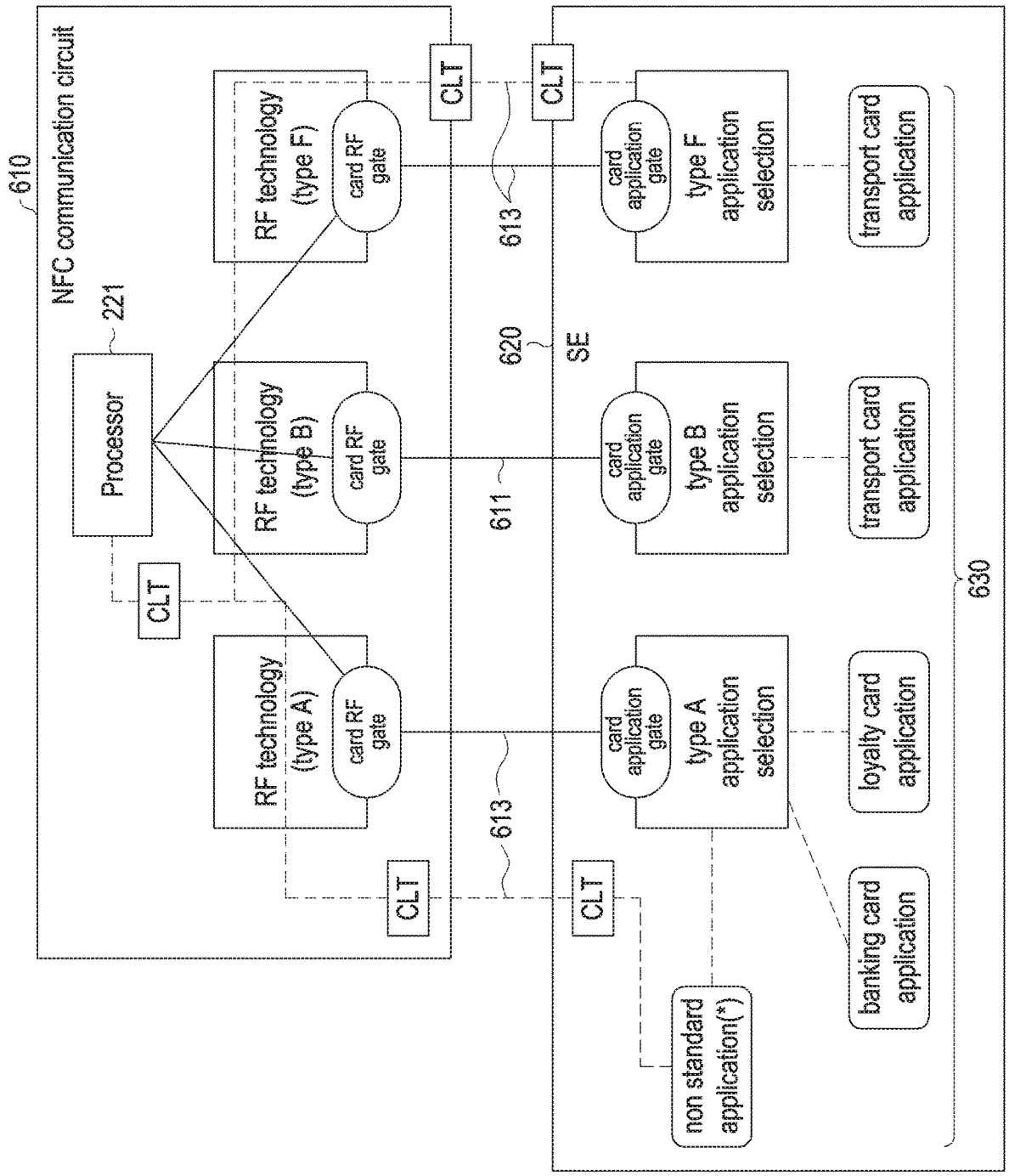
FIG. 6 is a view illustrating an example in which a processor accesses at least one secure element according to an embodiment of the disclosure.

FIG. 6 is a view illustrating an example in which a processor accesses at least one secure element according to an embodiment of the disclosure.

Referring to FIG. 6, it illustrates an example path along which a processor 221 included in an NFC communication circuit 610 accesses information in a secure element 620. The processor 221 may parse the USS IE and data payload received from a UWB communication circuit (e.g., the UWB communication circuit 210 of FIG. 2), identifying what type of technique and path the processor 221 is to use to access the information 630 about applications stored in the secure element 620. As set forth above, what type of technique and path 611 to 613 the processor 221 is to use to access the secure element 620 may be determined by the USS IE and data payload, and the details related to the determination may be determined to observe the IEEE 802.15.4-2015 standard. For example, when the payload IE defined by Mifare Classic® is included, the processor 221 may access the secure element 620 via the card RF gate of RF technology (type A). Specific examples are described below in detail with reference to FIGS. 7 to 10.

Figure 7:
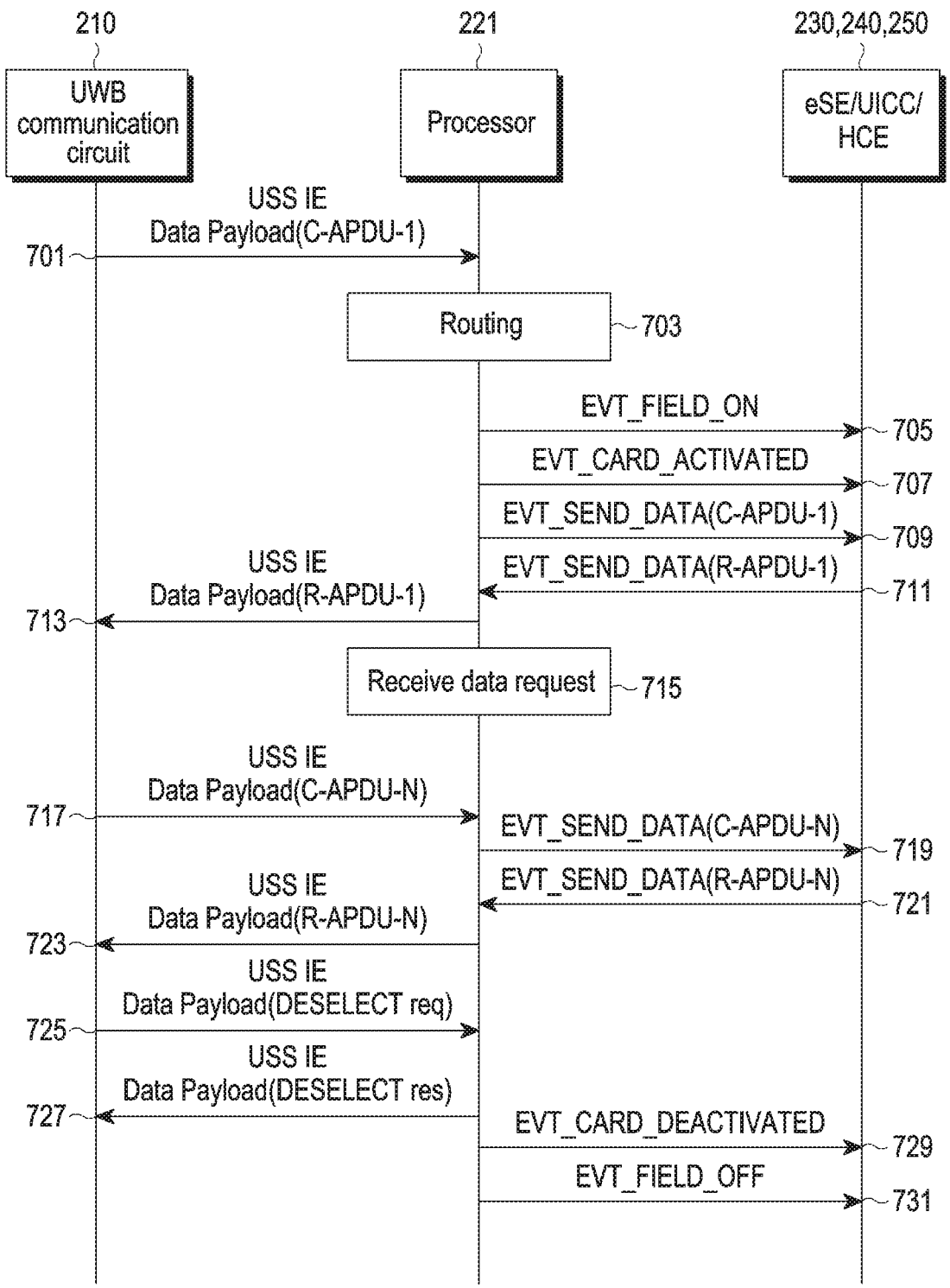
FIG. 7 is a view illustrating an example operation of an electronic device performing data transmission/reception with an external electronic device according to an embodiment of the disclosure.

FIG. 7 is a view illustrating an example operation of an electronic device performing data transmission/reception with an external electronic device according to an embodiment of the disclosure.

FIG. 8A is a view illustrating an example data request as shown in FIG. 7, according to an embodiment of the disclosure.

FIG. 8B is a view illustrating an example of at least part of security information transmitted to an external electronic device according to an embodiment of the disclosure.

FIG. 8C is a view illustrating an example routing table used by a processor when an electronic device receives an NFC signal according to an embodiment of the disclosure.

Referring to FIG. 7, FIG. 7 is a flowchart illustrating operations after user authentication is performed in the case where the UWB communication circuit 210 receives a data request including data payload including command-application protocol data unit (C-APDU)-1 and payload IE including AID from an external electronic device (e.g., the external electronic device 102 or 104). User authentication may be performed before the UWB communication circuit 210 transmits at least part of the security information to the external electronic device and may be performed between the operations of FIG. 7. According to an embodiment, C-APDU-1 may denote the first C-APDU received from the external electronic device. The payload type included in the data request of FIG. 7 may be "001."

In operation 701, the UWB communication circuit 210 may transmit the payload IE and data payload to the processor 221. In operation 703, the processor 221 may parse the payload IE and data payload and, based on the result of parsing and the routing table, perform a routing for determining the target secure element (e.g., 230, 240, or 250) among at least one secure element.

Referring to FIG. 8A, the MAC payload 800 of the data request may include the payload IE 810 and the data payload 820, and the payload IE 810 may include the payload type 811 and the USS ID 812. The processor 221 may identify the target secure element (e.g., 230, 240, or 250) based on the result of parsing the payload IE 810. For example, the processor 221 may identify that the payload type 811 is "001" and that "0x325041592E5359532E4444463031 (AID)" of the USS ID 812 is included and may thus identify the target secure element (e.g., 230, 240, or 250) corresponding to the AID.

According to an embodiment, upon identifying that the target secure element (e.g., 230, 240, or 250) via routing, the processor 221 may transmit "EVT_FIELD_ON" and "EVT_CARD_ACTIVATED," which indicate that APDUs may be exchanged, to the target secure element (e.g., 230, 240, or 250), in operations 705 and 707. In operation 709, the processor 221 may transmit C-APDU-1 included in the data payload to the target secure element (e.g., 230, 240, or 250) using "EVT_SEND_DATA." In operation 711, upon receiving C-APDU-1, the target secure element (e.g., 230, 240, or 250) may transmit R-APDU-1 corresponding to C-APDU-1 to the processor 221 using "EVT_SEND_DATA." For example, R-APDU-1 may include at least part of the security information corresponding to C-APDU-1. In operation 713, the processor 221 may transmit the payload IE and data payload including R-APDU-1 received from the target secure element (e.g., 230, 240, or 250) to the UWB communication circuit 210.

Referring to FIG. 8B, the MAC payload data format 840 may include the data payload 830 including R-APDU-1 received from the target secure element (e.g., 230, 240, or 250) in operation 711 and the payload IE 810 received from the UWB communication circuit 210 in operation 701. The UWB communication circuit 210 may transmit the MAC payload, which is a combination of R-APDU-1 and payload IE, to the external electronic device (e.g., the external electronic device 102 or 104), performing various functions, such as payment or authentication.

After operation 713, the processor 221 may receive a data request from the UWB communication circuit 210 in operation 715. According to an embodiment, the processor 221 may identify whether an NFC signal is detected from an NFC-supporting device.

According to an embodiment, when the UWB communication circuit 210 receives a new data request from the external electronic device 102 or 104, the processor 221 may receive the new data request from the UWB communication circuit 210 in operation 717. The new data request may include the same payload IE as the payload IE received in operation 701. For example, the payload IE may include an AID, and the data payload IE may include C-APDU-N. For example, C-APDU-N may denote the nth C-APDU received. In operation 719, the processor 221 may transmit C-APDU-N to the target secure element using "EVT_SEND_DATA." In operation 719, since the payload IE included in the new data request is identical to the payload received in operation 701, the processor 221 may not perform a routing operation for determining the target secure element (e.g., 230, 240, or 250). Since the card application gate (e.g., the card application gate of FIG. 6) of the target secure element (e.g., 230, 240, or 250) has been activated by operations 705 and 707, the processor 221 may refrain from transmitting "EVT_FIELD_ON" and "EVT_CARD_ACTIVATED" and may perform operation 719. In operation 721, the processor 221 may receive R-APDU-N corresponding to C-APDU-N from the target secure element (e.g., 230, 240, or 250). In operation 723, the processor 221 may transmit the received R-APDU-N, along with the payload IE, to the UWB communication circuit 210. The details of transmission of R-APDU-N are the same as operations 711 and 713 and are not further described below.

The UWB communication circuit 210 may receive a command indicating that the transaction has been done from the external electronic device (e.g., the external electronic device 102 or 104). Upon receiving the command indicating that the transaction has been done, the UWB communication circuit 210 may transmit a MAC payload, which includes DESELECT req in the data payload, to the processor 221 in operation 725. In operation 727, the processor 221 may transmit the MAC payload, which includes DESELECT res in the data payload, to the UWB communication circuit 210. In operations 729 and 731, the processor 221 may transmit EVT_CARD_DEACTIVATED and EVT_FIELD_OFF to the target secure element 230, 240, or 250. For example, EVT_CARD_DEACTIVATED may be a command to deactivate the card application gate (e.g., the card application gate of FIG. 6) of the target secure element (e.g., 230, 240, or 250). For example, EVT_FIELD_OFF may be a command to indicate that no NFC signal has been detected from the external electronic device (e.g., the external electronic device 102 or 104).

According to an embodiment, a data request which includes a MAC payload lacking AID and has the same configuration as that described above in connection with FIG. 7 may be received. In this case, upon identifying that the payload IE of the data request lacks an AID, the processor 221 may determine the target secure element (e.g., 230, 240, or 250) based on the default value of the ISO protocol. Referring to FIG. 5, the processor 221 may access the target secure element (e.g., an SIM (e.g., the UICC 240)) corresponding to the ISO-DEP in the routing table based on the protocol 520 and receive at least part of the security information from the target secure element (e.g., an SIM (e.g., the UICC 240)). The electronic device 101 may perform substantially the same operations as the operations of FIG. 7 except that the target secure element is varied depending on the presence or absence of an AID.

According to an embodiment, upon detecting an NFC signal from an external electronic device, e.g., an NFC reader, by the NFC communication circuit 220 of the electronic device 101, the processor 221 may switch to the NFC card emulation mode and configure the electronic device 101 to perform card emulation with the external electronic device.

Referring to FIG. 8C, the processor 221 may perform data transmission/reception with the external electronic device via a legacy NFC card emulation scheme, based on FIG. 8C. For example, when the target secure element supports only type A, the processor 221 may use a type A card RF gate and, upon supporting only type B, the processor 221 may use a type B card RF gate. When the target secure element supports type A and type B both, the processor 221 may use a type A card RF gate as default and, upon failing to use the type A card RF gate, the processor 221 may use a type B card RF gate.

Figure 9:
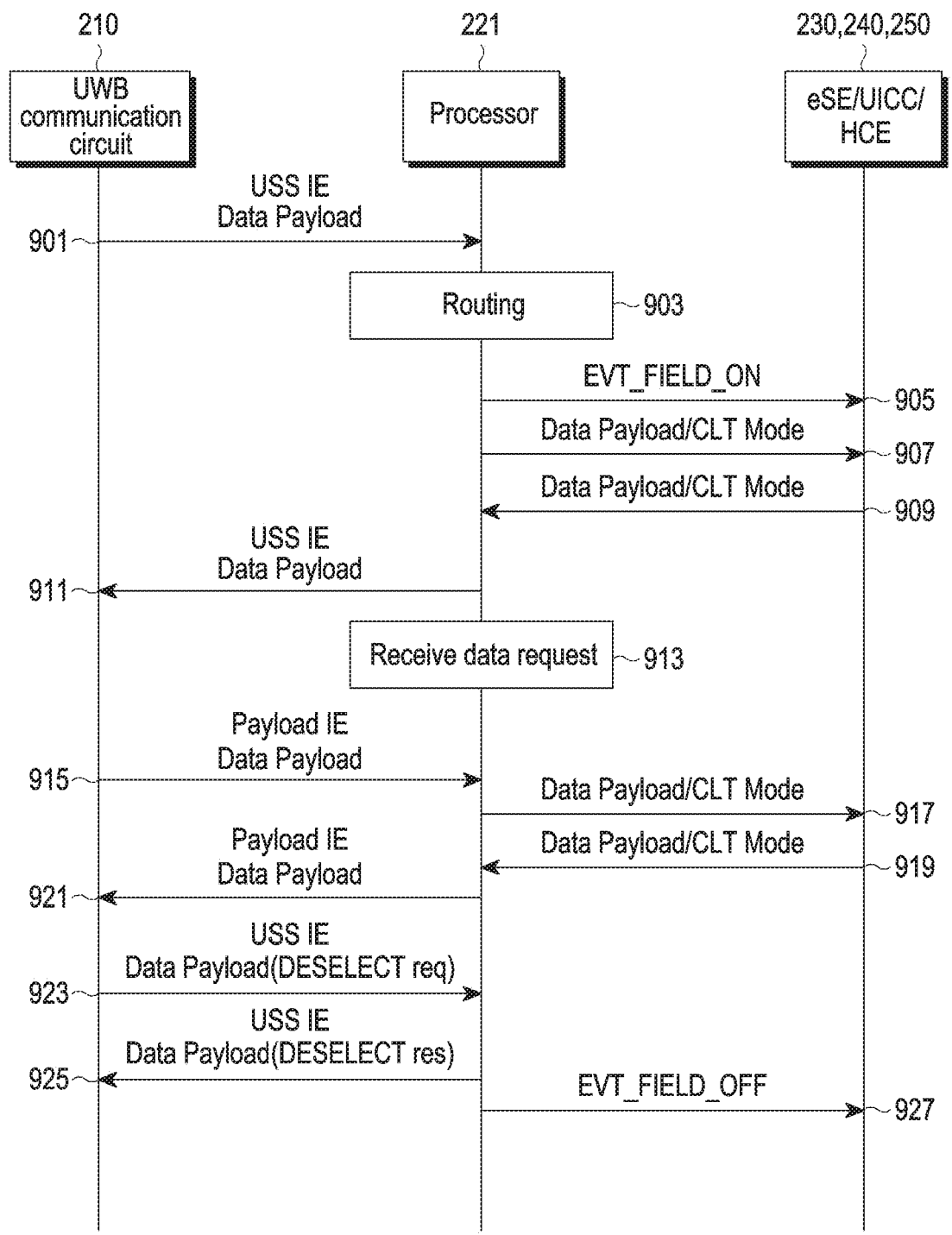
FIG. 9 is a view illustrating an example operation of an electronic device performing data transmission/reception with an external electronic device according to an embodiment of the disclosure.

FIG. 9 is a view illustrating an example operation of an electronic device performing data transmission/reception with an external electronic device according to an embodiment.

FIG. 9 is a flowchart illustrating operations after user authentication is performed in the case where the UWB communication circuit 210 receives a data request including a payload IE defined by Mifare Classic® and the relevant data payload from an external electronic device (e.g., the external electronic device 102 or 104). For example, the payload type included in the payload IE received from the external electronic device in FIG. 9 may be "01."

Referring to FIG. 9, in operation 901, the processor 221 may receive a data request including a payload IE defined by Mifare Classic® and the relevant data payload from the UWB communication circuit 210. In operation 903, the processor 221 may perform a routing for determining the target secure element (e.g., 230, 240, or 250) based on the routing table. The payload IE defined by Mifare Classic® may, or may not, include an AID. In a case where the payload IE defined by Mifare Classic® includes an AID, the processor 221 may first consider the AID in determining the target secure element (e.g., 230, 240, or 250) corresponding to the AID and, when no AID is included, may determine the target secure element (e.g., 230, 240, or 250) corresponding to type A in the routing table.

In operation 905, as the target secure element (e.g., 230, 240, or 250) is determined, the processor 221 may transmit "EVT_FIELD_ON," activating the determined target secure element (e.g., 230, 240, or 250). In operation 907, the processor 221 may transmit the data payload to the target secure element (e.g., 230, 240, or 250) in the CLT mode defined by ETSI TS 102 613. As the target secure element (e.g., 230, 240, or 250) receives the data payload, the target secure element (e.g., 230, 240, or 250) may include at least part of the security information corresponding to the received data payload in the data payload and transmit the same to the processor 221 in the CLT mode, in operation 909. In operation 911, the processor 221 may combine the payload IE and data payload received from the target secure element (e.g., 230, 240, or 250) and transmit the same to the UWB communication circuit 210. The UWB communication circuit 210 may transmit the received payload IE and data payload to the external electronic device 102 or 104.

After operation 911, the processor 221 may receive a data request from the UWB communication circuit 210 in operation 913. According to an embodiment, the processor 221 may identify whether an NFC signal is detected from an NFC-supporting device.

According to an embodiment, when the UWB communication circuit 210 receives a new data request from the external electronic device 102 or 104, the processor 221 may receive the new data request from the UWB communication circuit 210 in operation 915. The new data request may include the same payload IE as the payload IE received in operation 901. Since the target secure element (e.g., 230, 240, or 250) has been activated by the prior operations, the processor 221 may transmit the data payload, received using the CLT mode without routing and transmission of "EVT_FIELD_ON," to the target secure element (e.g., 230, 240, or 250), in operation 917. In operation 919, the target secure element (e.g., 230, 240, or 250) may include at least part of the security information corresponding to the data payload in the data payload and transmit the same to the processor

221. In operation 921, it, along with the payload IE, may be transmitted to the UWB communication circuit 210. The details are the same as those of operations 909 and 911 and are not further described below.

The UWB communication circuit 210 may receive a command indicating that the transaction has been done from the external electronic device (e.g., the external electronic device 102 or 104). Upon receiving the command indicating that the transaction has been done, the UWB communication circuit 210 may transmit a MAC payload, which includes DESELECT req in the data payload, to the processor 221 in operation 923. In operation 925, the processor 221 may transmit the MAC payload, which includes DESELECT res in the data payload, to the UWB communication circuit 210. In operation 927, the processor 221 may transmit EVT_FIELD_OFF to the target secure element (e.g., 230, 240, or 250) to instruct the target secure element (e.g., 230, 240, or 250) to finish data transmission.

According to an embodiment, the UWB communication circuit 210 may receive a data request including a payload IE defined by Mifare Desfire® and the relevant data payload from the external electronic device 102 or 104. For example, the payload type included in the payload IE defined by Mifare Desfire® may be "10." Since the UWB communication circuit 210, processor 221, and target secure element (e.g., 230, 240, or 250) perform the operations of FIG. 9 in the same manner, but the processor 221 performs data transmission using only type A RF gate for the target secure element (e.g., 230, 240, or 250) corresponding to the ISO protocol default value, only the target secure element (e.g., 230, 240, or 250) may be varied.

Figure 10:
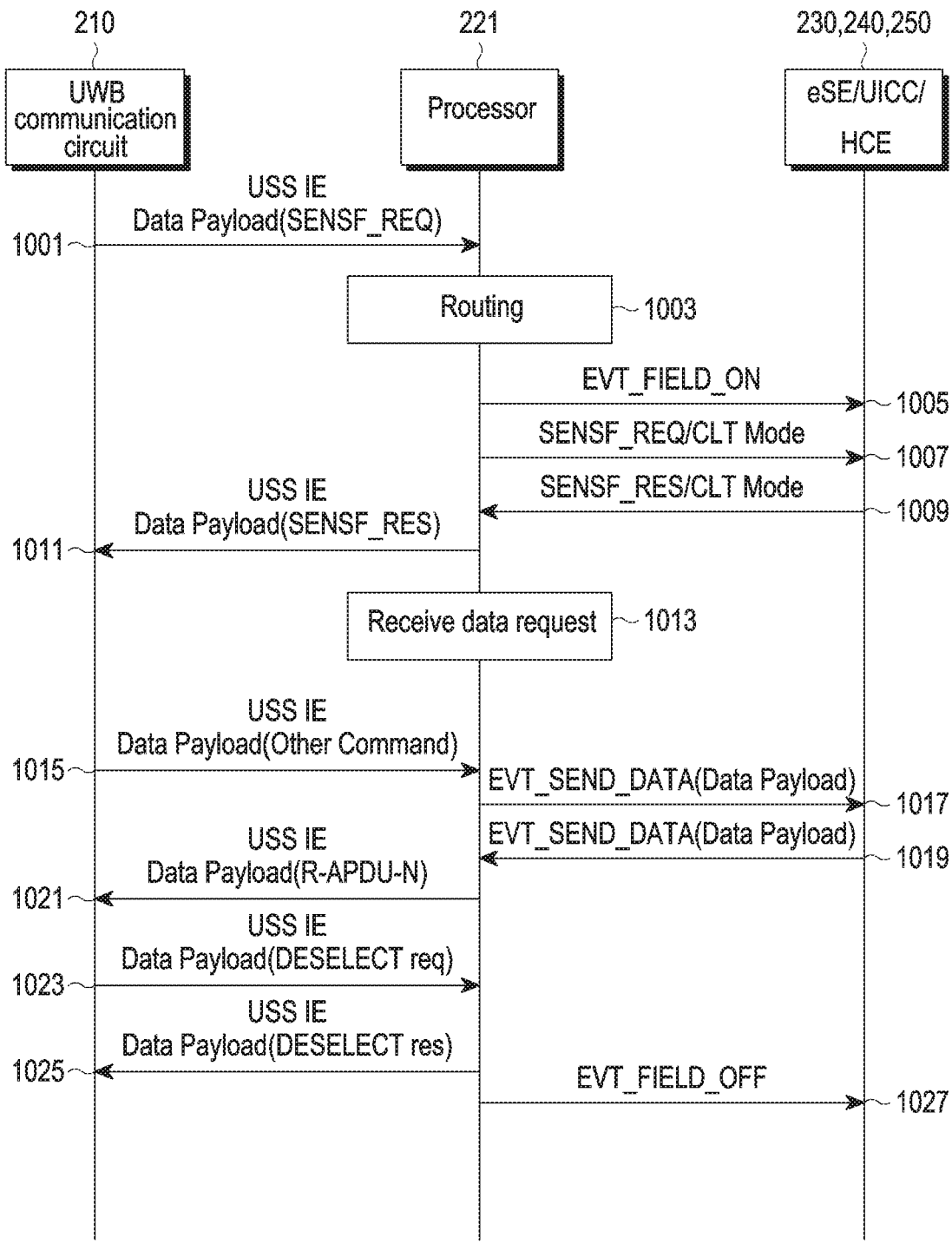
FIG. 10 is a view illustrating an example operation of an electronic device performing data transmission/reception with an external electronic device according to an embodiment of the disclosure.

FIG. 10 is a view illustrating an example operation of an electronic device performing data transmission/reception with an external electronic device according to an embodiment.

Referring to FIG. 10, FIG. 10 includes a flowchart illustrating operations after user authentication is performed in the case where the UWB communication circuit 210 receives a data request including a payload IE defined by JIS X 6319-4 and the relevant data payload from an external electronic device (e.g., the external electronic device 102 or 104). For example, the payload type included in the payload IE of the data request in FIG. 10 may be "11," and the MAC payload of the data request may include an information field defined by JIS X 6319-4. For example, the length of the USS ID of the payload IE may be set to 2, and the USS ID field may include a system code in the format defined by JIS X 6319-4.

Referring to FIG. 10, in operation 1001, the processor 221 may receive a data request including a payload IE defined by JIS X 6319-4 and the relevant data payload (SENSF-REQ) from the UWB communication circuit 210. SENSF-REQ may be a type F REQ command. In operation 1003, the processor 221 may perform a routing for determining the target secure element based on the routing table. The USS ID of the payload IE defined by JIS X 6319-4 may include a system code but may lack an AID. The processor 221 may determine the target secure element (e.g., 230, 240, or 250) corresponding to type F in the routing table based on the system code in the format defined by JIS X 6319-4 included in the payload IE defined by JIS X 6319-4.

In operation 1005, as the target secure element (e.g., 230, 240, or 250) is determined, the processor 221 may transmit "EVT_FIELD_ON," activating the target secure element (e.g., 230, 240, or 250). The processor 221 may configure a path along which the target secure element (e.g., 230, 240, or 250) is accessed according to the kind of command included in the data payload. When the data payload includes a type F REQ command, the processor 221 may transmit the data payload to the target secure element (e.g., 230, 240, or 250) using the CLT mode defined by ETSI TS 102 613 and, when the data payload includes different kinds of commands, the processor 221 may transmit it to the target secure element (e.g., 230, 240, or 250) using data payload EVT_SEND_DATA.

In operation 1007, the processor 221 may transmit the data payload (SENSF-REQ) to the target secure element (e.g., 230, 240, or 250) in the CLT mode defined by ETSI TS 102 613. As the target secure element (e.g., 230, 240, or 250) receives the data payload (SENSF-REQ), the target secure element (e.g., 230, 240, or 250) may include type F RES, which is at least part of the security information corresponding to the received data payload, in the data payload (SENSF-RES) and transmit the same to the processor 221 in the CLT mode, in operation 1009. In operation 1011, the processor 221 may combine the payload IE and data payload received from the target secure element (e.g., 230, 240, or 250) and transmit the same to the UWB communication circuit 210. The UWB communication circuit 210 may transmit the received payload IE and data payload (SENSF-RES) to the external electronic device 102 or 104.

After operation 1011, the processor 221 may receive a data request from the UWB communication circuit 210 in operation 1013. According to an embodiment, the processor 221 may identify whether an NFC signal is detected from an NFC-supporting device.

According to an embodiment, when the UWB communication circuit 210 receives a new data request from the external electronic device 102 or 104, the processor 221 may receive the new data request from the UWB communication circuit 210 in operation 1015. The data payload of the new data request may include a command other than the type F REQ command and may include the same payload IE as the payload IE received in operation 1001.

In operation 1017, upon receiving the command other than the type F REQ command, the processor 221 may transmit the received data payload to the target secure element (e.g., 230, 240, or 250) using EVT_SEND_DATA. In operation 1019, the target secure element (e.g., 230, 240, or 250) may include at least part of the security information corresponding to the data payload in the data payload using EVT_SEND_DATA and transmit the same to the processor 221. In operation 1017, upon receiving the same F REQ command as the type F REQ command, the processor 221 may transmit the data payload to the target secure element (e.g., 230, 240, or 250) in the CLT mode defined by ETSI TS 102 613. As the target secure element (e.g., 230, 240, or 250) receives the data payload, the target secure element (e.g., 230, 240, or 250) may include type F RES, which is at least part of the security information corresponding to the received data payload, in the data payload and transmit the same to the processor 221 in the CLT mode, in operation 1019.

In operation 1021, the processor 221 may transmit the received data payload, along with the payload IE, to the UWB communication circuit 210. The details are the same as those of operations 1009 and 1011 and are not further described below.

The UWB communication circuit 210 may receive a command indicating that the transaction has been done from the external electronic device (e.g., the external electronic device 102 or 104). Upon receiving the command indicating that the transaction has been done, the UWB communication circuit 210 may transmit a MAC payload, which includes DESELECT req in the data payload, to the processor 221 in operation 1023. In operation 1025, the processor 221 may transmit the MAC payload, which includes DESELECT res in the data payload, to the UWB communication circuit 210. In operation 1027, the processor 221 may transmit EVT_FIELD_OFF to the target secure element (e.g., 230, 240, or 250) to instruct the target secure element (e.g., 230, 240, or 250) to finish data transmission.

As set forth above, according to various embodiments, the electronic device 101 may perform various functions, e.g., payment, authentication, or file transfer, via UWB communication which has a longer communication range than NFC, while retaining the high security of NFC communication.

According to various embodiments, an electronic device 101 comprises an NFC communication circuit 220, a UWB communication circuit 210 connected with the NFC communication circuit, at least one secure element (e.g., the eSE 230, UICC 240, or HCE 250) operatively connected with the NFC communication circuit 220 and configured to store security information, and a processor 221 disposed in the NFC communication circuit 220 and operatively connected with the UWB communication circuit 210. The processor 221 may be configured to receive a data request from an external electronic device via the UWB communication circuit 210, access at least part of the security information stored in the at least one secure element (e.g., 230, 240, or 250), based on a routing table matching the data request with the at least one secure element, and transmit at least part of the security information to the external electronic device 102 or 104 via the UWB communication circuit 210.

According to various embodiments, the data request may include at least one of a payload information element (IE) and a data payload. The processor 221 may be configured to parse at least one of the payload IE and the data payload and access a first secure element among the at least one secure element (e.g., 230, 240, or 250), based on a result of the parsing.

According to various embodiments, the routing table may match the payload IE included in the data request with the at least one secure element. The processor 221 may be configured to identify the first secure element among the at least one secure element (e.g., 230, 240, or 250) based on the routing table.

According to various embodiments, when the payload IE includes an application identifier (AID), and the data payload includes a command application protocol data unit (C-APDU), the processor 221 may be configured to identify the first secure element corresponding to a USS ID among the at least one secure element (e.g., 230, 240, or 250) of the routing table, transmit the C-APDU to the first secure element, and receive at least part of the security information including a response application protocol data unit (R-APDU) from the first secure element.

According to various embodiments, when the payload IE does not include an application identifier (AID), and the data payload includes a C-APDU, the processor 221 may be configured to identify the first secure element corresponding to an international organization for standardization (ISO) protocol default value among the at least one secure element of the routing table, transmit the C-APDU to the first secure element, and receive at least part of the security information including an R-APDU from the first secure element.

According to various embodiments, when the payload IE and the data payload are defined by Mifare Classic, the processor 221 may be configured to identify the first secure element corresponding to the payload IE and a type A default value among the at least one secure element (e.g., 230, 240, or 250) of the routing table, transmit the data payload to the first secure element using a contactless tunneling (CLT) mode defined by ETSI TS 102 613, and receive part of the security information corresponding to the data payload using the CLT mode, from the first secure element.

According to various embodiments, when the payload IE and the data payload are defined by Mifare Desfire, the processor 221 may be configured to identify the first secure element corresponding to type A among ISO protocol default values of the routing table among the at least one secure element, transmit the data payload to the first secure element using a contactless tunneling (CLT) mode defined by ETSI TS 102 613, and receive part of the security information corresponding to the data payload using the CLT mode, from the first secure element.

According to various embodiments, when the payload IE and the data payload are defined by JIS X 6319-4, the processor 221 may be configured to identify the first secure element among the at least one secure element corresponding to a type F default value and the payload IE of the routing table.

According to various embodiments, when the data payload is a type F request command, the processor 221 may be configured to transmit the data payload to the first secure element using a CLT mode defined by ETSI TS 102 613 and receive at least part of the security information including a type F response from the first secure element using the CLT mode.

According to various embodiments, unless the data payload is a type F request command, the processor 221 may be configured to transmit the data payload to the first secure element and receive at least part of the security information corresponding to the data payload from the first secure element.

According to various embodiments, an electronic device 101 comprises an NFC communication circuit 220, a UWB communication circuit 210 connected with the NFC communication circuit 220, at least one secure element (e.g., 230, 240, or 250) operatively connected with the NFC communication circuit 220 and configured to store security information, and a processor 221 disposed in the NFC communication circuit 220 and operatively connected with the UWB communication circuit 210. The UWB communication circuit 210 is configured to receive a data request from an external electronic device 102 or 104, transmit the received data request to the NFC communication circuit 220, receive at least part of the security information stored in the at least one secure element, from the NFC communication circuit 220, and transmit the received at least part of the security information to the external electronic device (102 or 104).

According to various embodiments, the data request may include at least one of a payload information element (IE) and a data payload. The UWB communication circuit 210 may be configured to, as at least part of transmitting the received data request to the NFC communication circuit 220, identify whether to transmit the data request to the NFC communication circuit 220, based on a routing table matching the data request with the at least one secure element.

According to various embodiments, the data request may include at least one of a payload information element (IE) and a data payload. The processor 221 may be configured to parse at least one of the payload IE and the data payload and access a first secure element among the at least one secure element (e.g., 230, 240, or 250), based on a result of the parsing.

According to various embodiments, the processor 221 may be configured to identify the first secure element among the at least one secure element (e.g., 230, 240, or 250) based on a routing table matching the payload IE with the at least one secure element (e.g., 230, 240, or 250).

According to various embodiments, when the payload IE includes an application identifier (AID), and the data payload includes a command application protocol data unit (C-APDU), the processor 221 may be configured to identify the first secure element corresponding to a USS ID among the at least one secure element (e.g., 230, 240, or 250) of the routing table, transmit the C-APDU to the first secure element, and receive at least part of the security information including a response application protocol data unit (R-APDU) from the first secure element.

According to various embodiments, when the payload IE does not include an application identifier (AID), and the data payload includes a C-APDU, the processor 221 may be configured to identify the first secure element corresponding to an international organization for standardization (ISO) protocol default value among the at least one secure element of the routing table, transmit the C-APDU to the first secure element, and receive at least part of the security information including an R-APDU from the first secure element.

According to various embodiments, when the payload IE and the data payload are defined by Mifare Classic, the processor 221 may be configured to identify the first secure element corresponding to the payload IE and a type A default value among the at least one secure element (e.g., 230, 240, or 250) of the routing table, transmit the data payload to the first secure element using a contactless tunneling (CLT) mode defined by ETSI TS 102 613, and receive part of the security information corresponding to the data payload using the CLT mode, from the first secure element.

According to various embodiments, when the payload IE and the data payload are defined by Mifare Desfire, the processor 221 may be configured to identify the first secure element corresponding to type A among ISO protocol default values of the routing table among the at least one secure element, transmit the data payload to the first secure element using a contactless tunneling (CLT) mode defined by ETSI TS 102 613, and receive part of the security information corresponding to the data payload using the CLT mode, from the first secure element.

According to various embodiments, when the payload IE and the data payload are defined by JIS X 6319-4, the processor 221 may be configured to identify the first secure element among the at least one secure element corresponding to a type F default value and the payload IE of the routing table.

According to various embodiments, when the data payload is a type F request command, the processor 221 may be configured to transmit the data payload to the first secure element using a CLT mode defined by ETSI TS 102 613 and receive at least part of the security information including a type F response from the first secure element using the CLT mode.

According to various embodiments, unless the data payload is a type F request command, the processor 221 may be configured to transmit the data payload to the first secure element and receive at least part of the security information corresponding to the data payload from the first secure element.

According to various embodiments, an electronic device 101 comprises an NFC antenna, a UWB antenna, at least one secure element (e.g., 230, 240, or 250) configured to store security information associated with a user of the electronic device 101, and a communication interface connected with the NFC antenna, the UWB antenna, and the at least one secure element (e.g., 230, 240, or 250). The communication interface is configured to receive a data request from an external electronic device via the UWB antenna, access at least part of the security information stored in the at least one secure element (e.g., 230, 240, or 250), based on the reception of the data request, and transmit at least part of the security information to the external electronic device via the UWB antenna.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a near-field communication (NFC) communication circuit;
an ultra-wideband (UWB) communication circuit connected with the NFC communication circuit;
at least one secure element operatively connected with the NFC communication circuit and configured to store security information; and
a processor disposed in the NFC communication circuit and operatively connected with the UWB communication circuit,
wherein the processor is configured to:
receive a data request from an external electronic device via the UWB communication circuit, wherein the data request includes a payload information element (IE) and a data payload,
identify a first secure element among the at least one secure element, based on a routing table matching the payload IE with the at least one secure element,
access at least part of the security information corresponding to the data payload stored in the first secure element, based on transmitting the data payload to the first secure element, and
transmit the at least part of the security information to the external electronic device via the UWB communication circuit, and
wherein the UWB communication circuit is configured to:
perform user authentication based on identifying whether the user authentication is required to transmit the received data request to the NFC communication circuit, and
transmit the received data request to the NFC communication circuit, based on the result of the user authentication.

2. The electronic device of claim 1,
wherein the processor is further configured to:
parse at least one of the payload IE or the data payload, and
access the first secure element among the at least one secure element, based on a result of the parsing.

3. The electronic device of claim 2,
wherein the processor is further configured to identify the first secure element among the at least one secure element based on the routing table.

4. The electronic device of claim 3, wherein, when the payload IE includes an application identifier (AID), and the data payload includes a command application protocol data unit (C-APDU), the processor is further configured to:
identify the first secure element corresponding to a UWB secure service (USS) ID among the at least one secure element of the routing table,
transmit the C-APDU to the first secure element, and
receive at least part of the security information including a response application protocol data unit (R-APDU) from the first secure element.

5. The electronic device of claim 3, wherein, when the payload IE does not include an application identifier (AID), and the data payload includes a command application protocol data unit (C-APDU), the processor is further configured to:
identify the first secure element corresponding to an international organization for standardization (ISO) protocol default value among the at least one secure element of the routing table,
transmit the C-APDU to the first secure element, and
receive at least part of the security information including a response application protocol data unit (R-APDU) from the first secure element.

6. The electronic device of claim 3, wherein, when the payload IE and the data payload are defined by Mifare Classic, the processor is further configured to:
identify the first secure element corresponding to the payload IE and a type A default value among the at least one secure element of the routing table,
transmit the data payload to the first secure element using a contactless tunneling (CLT) mode defined by ETSI TS 102 613, and
receive part of the security information corresponding to the data payload using the CLT mode, from the first secure element.

7. The electronic device of claim 3, wherein, when the payload IE and the data payload are defined by Mifare Desfire, the processor is further configured to:
identify the first secure element corresponding to type A among ISO protocol default values of the routing table among the at least one secure element, transmit the data payload to the first secure element using a contactless tunneling (CLT) mode defined by ETSI TS 102 613, and receive part of the security information corresponding to the data payload using the CLT mode, from the first secure element.

8. The electronic device of claim 3, wherein, when the payload IE and the data payload are defined by JIS X 6319-4, the processor is further configured to:

identify the first secure element among the at least one secure element corresponding to a type F default value and the payload IE of the routing table.

9. The electronic device of claim 8, wherein, when the data payload is a type F request command the processor is further configured to:

transmit the data payload to the first secure element using a contactless tunneling (CLT) mode defined by ETSI TS 102 613, and receive at least part of the security information including a type F response from the first secure element using the CLT mode.

10. The electronic device of claim 8, wherein, when the data payload is not a type F request command the processor is further configured to:

transmit the data payload to the first secure element, and receive at least part of the security information corresponding to the data payload from the first secure element.

11. An electronic device comprising:

a near-field communication (NFC) communication circuit;

an ultra-wideband (UWB) communication circuit connected with the NFC communication circuit;

at least one secure element operatively connected with the NFC communication circuit and configured to store security information; and a processor disposed in the NFC communication circuit and operatively connected with the UWB communication circuit, wherein the UWB communication circuit is configured to:
receive a data request from an external electronic device, wherein the data request includes a payload information element (IE) and a data payload, perform user authentication based on identifying whether the user authentication is required to transmit the received data request to the NFC communication circuit, identify whether to transmit the data request to the NFC communication circuit, based on a routing table matching the payload IE with the at least one secure element, transmit the received data request to the NFC communication circuit, based on the result of the identifying, receive at least part of the security information stored in the at least one secure element, from the NFC communication circuit, and transmit the received at least part of the security information to the external electronic device, and wherein the processor is configured to:
access at least part of the security information corresponding to the data payload stored in a first secure element among the at least one secure element, based on transmitting the data payload to the first secure element, and transmit the at least part of the security information to the UWB communication circuit.

12. The electronic device of claim 11, wherein the processor is further configured to:

parse at least one of the payload IE or the data payload, and access the first secure element among the at least one secure element, based on a result of the parsing.

13. The electronic device of claim 12, wherein the processor is further configured to identify the first secure element among the at least one secure element based on the routing table.

14. The electronic device of claim 13, wherein, when the payload IE includes an application identifier (AID), and the data payload includes a command application protocol data unit (C-APDU), the processor is further configured to:

identify the first secure element corresponding to a UWB secure service identifier (USS ID) among the at least one secure element of the routing table, transmit the C-APDU to the first secure element, and receive at least part of the security information including an response application protocol data unit (R-APDU) from the first secure element.

15. The electronic device of claim 13, wherein, when the payload IE does not include an application identifier (AID), and the data payload includes a command application protocol data unit (C-APDU), the processor is further configured to:

identify the first secure element corresponding to an international organization for standardization (ISO) protocol default value among the at least one secure element of the routing table, transmit the C-APDU to the first secure element, and receive at least part of the security information including an response application protocol data unit (R-APDU) from the first secure element.

16. The electronic device of claim 13, wherein, when the payload IE and the data payload are defined by Mifare Classic, the processor is further configured to:

identify the first secure element corresponding to the payload IE and a type A default value among the at least one secure element of the routing table, transmit the data payload to the first secure element using a contactless tunneling (CLT) mode defined by ETSI TS 102 613, and receive part of the security information corresponding to the data payload using the CLT mode, from the first secure element.

17. The electronic device of claim 13, wherein, when the payload IE and the data payload are defined by Mifare Desfire, the processor is further configured to:

identify the first secure element corresponding to type A among ISO protocol default values of the routing table among the at least one secure element, transmit the data payload to the first secure element using a contactless tunneling (CLT) mode defined by ETSI TS 102 613, and receive part of the security information corresponding to the data payload using the CLT mode, from the first secure element.

18. The electronic device of claim 13, wherein the processor is further configured to:

when the payload IE and the data payload are defined by JIS X 6319-4, define the first secure element among the at least one secure element corresponding to a type F default value and the payload IE of the routing table, and when the data payload is a type F request command, transmit the data payload to the first secure element using a CLT mode defined by ETSI TS 102 613 and receive at least part of the security information including a type F response from the first secure element using the CLT mode.

* * * * *